(12) United States Patent
Thomas et al.

(10) Patent No.: US 9,590,709 B2
(45) Date of Patent: Mar. 7, 2017

(54) METHODS, APPARATUSES, AND COMPUTER-READABLE STORAGE MEDIA FOR PERFORMING MULTIDIMENSIONAL BEAMFORMING

(75) Inventors: Timothy A. Thomas, Palatine, IL (US); Frederick Vook, Schaumburg, IL (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 1106 days.

(21) Appl. No.: 13/336,286

(22) Filed: Dec. 23, 2011

(65) Prior Publication Data
US 2013/0162476 A1  Jun. 27, 2013

(51) Int. Cl.
| H01Q 3/00 | (2006.01) |
|---|---|
| H04B 7/04 | (2006.01) |
| H01Q 3/30 | (2006.01) |
| H04B 7/06 | (2006.01) |
| H01Q 21/29 | (2006.01) |

(52) U.S. Cl.
CPC ............. *H04B 7/0469* (2013.01); *H01Q 3/30* (2013.01); *H04B 7/0639* (2013.01); *H01Q 3/00* (2013.01); *H01Q 21/29* (2013.01); *H04B 7/0421* (2013.01); *H04B 7/0456* (2013.01)

(58) Field of Classification Search
CPC .......... H01Q 3/26; H01Q 3/2665; H01Q 3/28; H01Q 3/30; H01Q 3/00; H01Q 21/29; H01Q 25/001; H04B 7/0469; H04B 7/0456; H04B 7/0639; H04B 7/0421; H04B 7/0626; H04B 7/0634

USPC .......................... 342/368, 369, 372, 373, 377
See application file for complete search history.

(56) References Cited

U.S. PATENT DOCUMENTS

| 5,649,287 | A | * | 7/1997 | Forssen et al. ............... 370/312 |
|---|---|---|---|---|
| 5,818,385 | A | | 10/1998 | Bartholomew ............... 343/372 |
| 6,314,305 | B1 | * | 11/2001 | Solondz ................. H01Q 1/246 342/373 |
| 7,245,939 | B2 | * | 7/2007 | Goldberg ................. H01Q 3/08 342/368 |
| 8,040,970 | B2 | | 10/2011 | Pare, Jr. ......................... 375/295 |
| 8,301,100 | B2 | * | 10/2012 | Shiotsuki et al. ......... 455/276.1 |
| 8,619,894 | B1 | * | 12/2013 | Thomas et al. ............... 375/267 |
| 8,891,647 | B2 | * | 11/2014 | Ma ....................... H04B 7/0417 375/267 |
| 2006/0019710 | A1 | * | 1/2006 | Ylitalo ................. H01Q 3/2605 455/562.1 |
| 2007/0099578 | A1 | * | 5/2007 | Adeney ................ H04B 7/0408 455/69 |

(Continued)

*Primary Examiner* — Chuong P Nguyen
(74) *Attorney, Agent, or Firm* — Harrington & Smith

(57) ABSTRACT

Methods, apparatuses and computer-readable storage media perform phasing of a first array including one or more antenna elements and phasing of a second array including one or more antenna elements to provide a combined radiation pattern for the first and second arrays, the first array having a first radiation pattern and the second array having a second radiation pattern, wherein the first radiation pattern is substantially orthogonal to the second radiation pattern. The combined radiation pattern is controlled in a first dimension based upon an uplink channel measurement. The combined radiation pattern is controlled in a second dimension based upon a precoding feedback from a user equipment (UE).

16 Claims, 10 Drawing Sheets

(56) References Cited

U.S. PATENT DOCUMENTS

| | | | |
|---|---|---|---|
| 2008/0268797 A1 | 10/2008 | Ahn et al. | 455/127.1 |
| 2009/0046674 A1* | 2/2009 | Gao et al. | 370/337 |
| 2009/0167605 A1* | 7/2009 | Haskell | 342/372 |
| 2009/0318088 A1 | 12/2009 | Wu et al. | 455/63.4 |
| 2009/0323847 A1* | 12/2009 | Na | H04B 7/0413 375/267 |
| 2010/0054200 A1 | 3/2010 | Tsai | 370/329 |
| 2011/0150052 A1 | 6/2011 | Erell et al. | 375/219 |
| 2011/0170427 A1 | 7/2011 | Koivisto et al. | 370/252 |
| 2011/0182375 A1 | 7/2011 | Kim et al. | 375/260 |
| 2011/0249767 A1 | 10/2011 | Chen et al. | 375/295 |
| 2013/0259151 A1* | 10/2013 | Thomas et al. | 375/267 |

\* cited by examiner

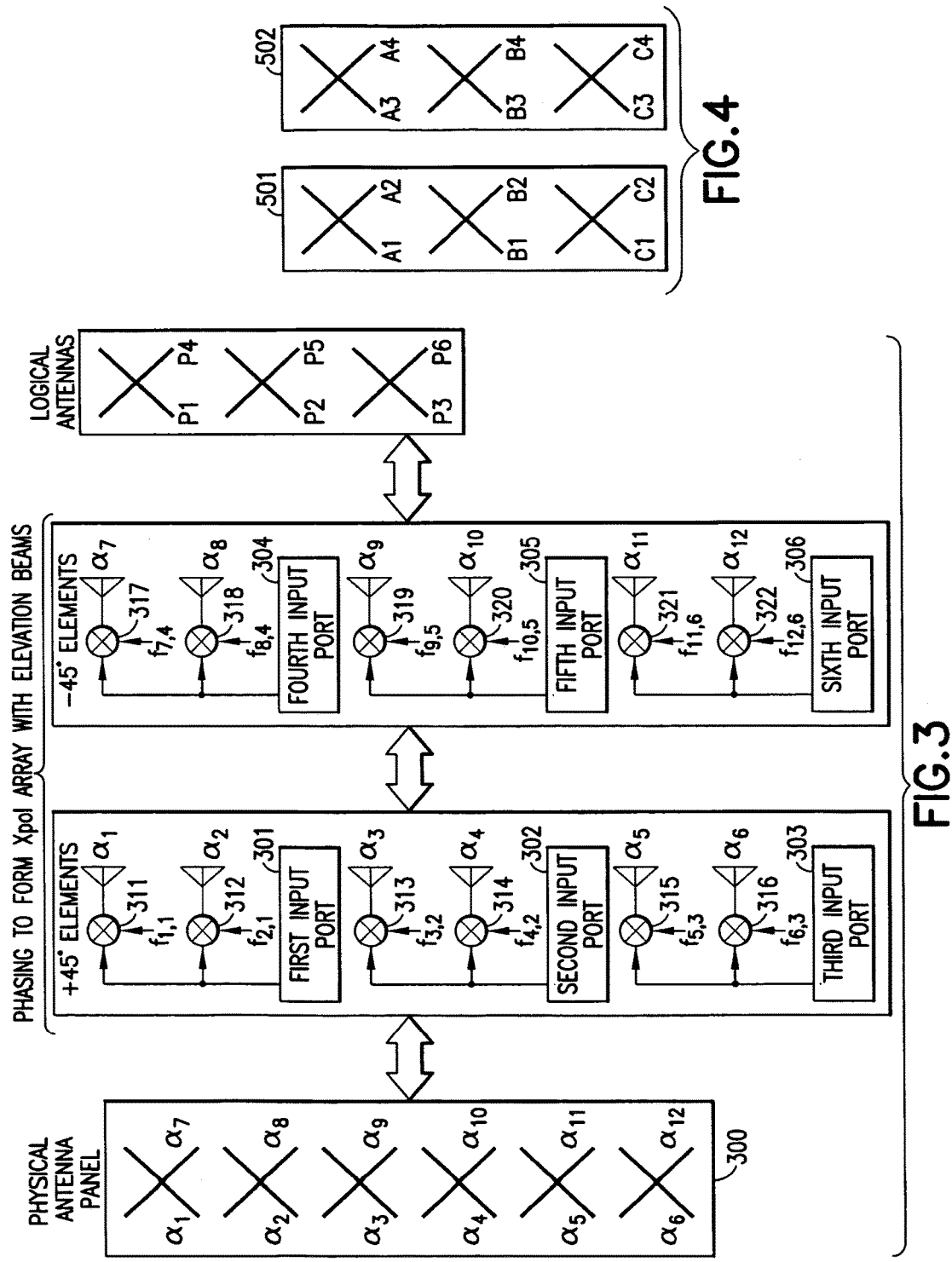

METHODS, APPARATUSES, AND COMPUTER-READABLE STORAGE MEDIA FOR PERFORMING MULTIDIMENSIONAL BEAMFORMING

TECHNICAL FIELD

This invention relates generally to wireless networks and, more specifically, to methods and systems for performing multidimensional beamforming.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third generation partnership project
Co-pol co-polarization, co-polarized
CDF cumulative distribution function
CQI channel quality indicator
DL downlink
ECGI E-UTRAN cell global identifier
eNB evolved Node B/base station in an E-UTRAN system
E-UTRAN evolved UTRAN (LTE)
FDD frequency division duplex
ID identification
InH indoor hotspot
IMSI international mobile subscriber identity
ITU International Telecommunications Union
LA location area
LOS loss of signal
LTE long term evolution
LTE-A long term evolution advanced
MCC mobile country code
MME mobility management entity
Nrx Number of Receive Antennas
PLMN public land mobile network
PMI precoder matrix index
RA routing area
RAN radio access network
RMa rural macro
RNC radio network controller
RRC radio resource control
SNR signal-to-noise ratio
SRS sounding reference signal
TDD time division duplex
TS technical standard
UE user equipment
UL uplink
UMa urban macro
UMi urban micro
UTRAN universal terrestrial radio access network
XPOL cross polarization, cross-polarized Antenna deployments for wireless networks may consist of antenna arrays containing a plurality of co-polarized (co-pol) elements, such as a plurality of elements with vertical-only polarization or a plurality of elements with horizontal-only polarization. In wireless networks employing beamforming, these co-pol elements are phased to form a single logical antenna having a radiation pattern that can be controlled in the azimuthal dimension. A similar concept is often employed inside antenna panel arrays containing a plurality of cross-polarized (XPOL) elements for the purpose of combining several antenna elements into one logical antenna port. For example, FIG. 1 illustrates a physical XPOL antenna panel 100 comprised of multiple elements $\alpha_1, \alpha_2 \ldots \alpha_Q$ arranged at +45° polarization with reference to the horizontal plane, as well as multiple elements $\alpha_{Q+1}, \alpha_{Q+2} \ldots \alpha_{2Q}$ arranged at −45° polarization with reference to the horizontal plane. The +45° elements $\alpha_1, \alpha_2 \ldots \alpha_Q$ are phased to form a single logical +45° antenna P1. Likewise, the −45° elements $\alpha_{Q+1}, \alpha_{Q+2} \ldots \alpha_{2Q}$ are phased to form a single logical −45° antenna P2. The XPOL antenna panel 100 of FIG. 1 forms a single logical antenna port for each polarization, such that the logical antenna P1 forms a single first logical antenna port for the +45° polarization, and the logical antenna P2 forms a single second logical antenna port for the −45° polarization.

The XPOL antenna panel 100 therefore forms a logical two-port XPOL array. The logical +45° antenna P1 is implemented using a first input port 102, and the logical −45° antenna P2 is implemented using a second input port 104. The first input port 102 is connected to a first input of a first multiplier 106, a first input of a second multiplier 108, and a first input of a third multiplier 110. A first transmit (Tx) weight $f_1$ is applied to a second input of the first multiplier 106. A second Tx weight $f_2$ is applied to a second input of the second multiplier 108. Likewise, a third Tx weight $f_Q$ is applied to a second input of the third multiplier 110. An output of the first multiplier 106 is connected to the element $\alpha_1$, an output of the second multiplier 108 is connected to the element $\alpha_2$, and an output of the third multiplier 110 is connected to the element $\alpha_Q$.

The second input port 104 of the XPOL antenna panel 100 is connected to a first input of a fourth multiplier 112, a first input of a fifth multiplier 114, and a first input of a sixth multiplier 116. A fourth Tx weight $f_{Q+1}$ is applied to a second input of the fourth multiplier 112. A fifth Tx weight $f_{Q+2}$ is applied to a second input of the fifth multiplier 114. Likewise, a sixth Tx weight $f_{2Q}$ is applied to a second input of the sixth multiplier 116. An output of the fourth mixer 112 is connected to the element $\alpha_{Q+1}$, an output of the fifth multiplier 114 is connected to the element $\alpha_{Q+2}$, and an output of the sixth multiplier 116 is connected to the element $\alpha_{2Q}$.

In the case of XPOL as well as co-pol antenna panels, electrical phasing (through the proper selection of the Tx weights $f_1 \ldots f_{2Q}$) may be used to control the vertical plane radiation patterns of the logical antennas in the antenna panel so as to create a specific pattern in the elevation dimension. This technique is called electrical beam tilt. In some situations, mechanical beam tilt may be employed in addition to, or in lieu of, electrical phasing to optimize cell coverage. Beam tilt is often used to increase the overall gain of antenna panels and also to improve coverage of macrocells when antenna panels are mounted on structures situated at a relatively high elevation above ground, such as atop a high tower or tall building. However, mechanical beam tilt is slow to adapt to changing conditions and both mechanical and electric phasing mentioned above apply the same downtilt to all users being transmitted to at a given time. But regardless of whether mechanical beam tilt, electrical beam tilt, or some combination thereof is implemented, the resulting elevation pattern may not be optimum for every user in a given cell. Hence there is a need for a method and apparatus to perform per-user beamforming in both the azimuth and elevation dimensions

SUMMARY OF THE INVENTION

According to a first aspect of the invention, a method comprises phasing a first array including one or more antenna elements and a second array including one or more antenna elements to provide a combined radiation pattern for the first and second arrays, the first array having a first radiation pattern and the second array having a second radiation pattern, wherein the first radiation pattern is substantially orthogonal to the second radiation pattern; controlling the combined radiation pattern in a first dimension based upon an uplink channel measurement; and controlling the combined radiation pattern in a second dimension based upon a precoding feedback from a user equipment (UE).

According to a second aspect of the invention, an apparatus comprises a phasing mechanism configured to phase a first array including one or more antenna elements and a second array including one or more antenna elements to provide a combined radiation pattern for the first and second arrays, the first array having a first radiation pattern and the second array having a second radiation pattern, wherein the first radiation pattern is substantially orthogonal to the second radiation pattern; and a controlling mechanism configured to control the combined radiation pattern in a first dimension based upon an uplink channel measurement, and configured to control the combined radiation pattern in a second dimension based upon a precoding feedback from a user equipment (UE).

According to a third aspect of the invention, a non-transitory computer readable storage medium is provided with an executable program stored thereon. The program instructs a processing device to perform phasing of a first array including one or more antenna elements and a second array including one or more antenna elements to provide a combined radiation pattern for the first and second arrays, the first array having a first radiation pattern and the second array having a second radiation pattern, wherein the first radiation pattern is substantially orthogonal to the second radiation pattern; and controlling the combined radiation pattern in a first dimension based upon an uplink channel measurement; and controlling the combined radiation pattern in a second dimension based upon a precoding feedback from a user equipment (UE).

According to a fourth aspect of the invention, an apparatus comprises a phasing means for phasing a first array including one or more antenna elements and a second array including one or more antenna elements to provide a combined radiation pattern for the first and second arrays, the first array having a first radiation pattern and the second array having a second radiation pattern, wherein the first radiation pattern is substantially orthogonal to the second radiation pattern; and a controlling means for controlling the combined radiation pattern in a first dimension based upon an uplink channel measurement, and for controlling the combined radiation pattern in a second dimension based upon a precoding feedback from a user equipment (UE).

BRIEF DESCRIPTION OF THE DRAWINGS

FIG. 3 is a block diagram of a third exemplary antenna panel phasing configuration suitable for use with the instant invention;

FIG. 4 is a block diagram of an exemplary antenna panel configuration suitable for use with the instant invention;

DETAILED DESCRIPTION OF THE DRAWINGS

Figure 1:
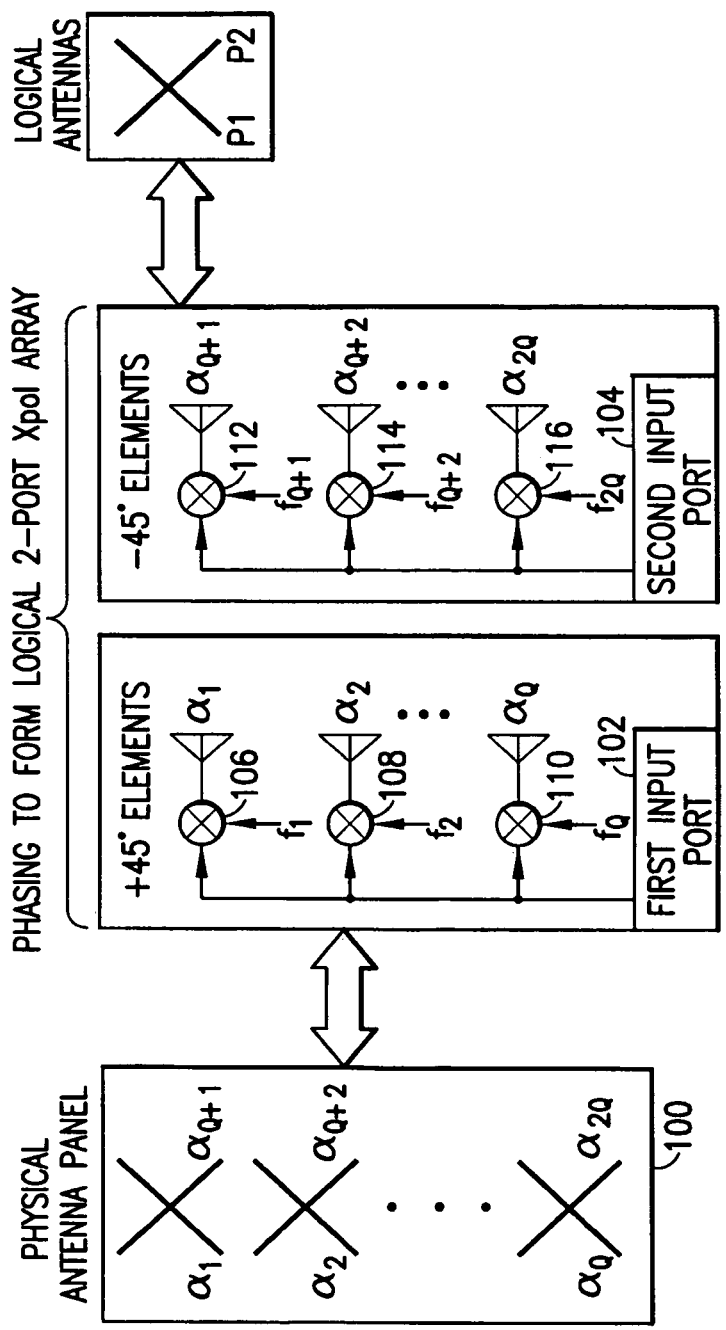
FIG. 1 is a block diagram illustrating a first exemplary antenna panel phasing configuration.
Figure 2:
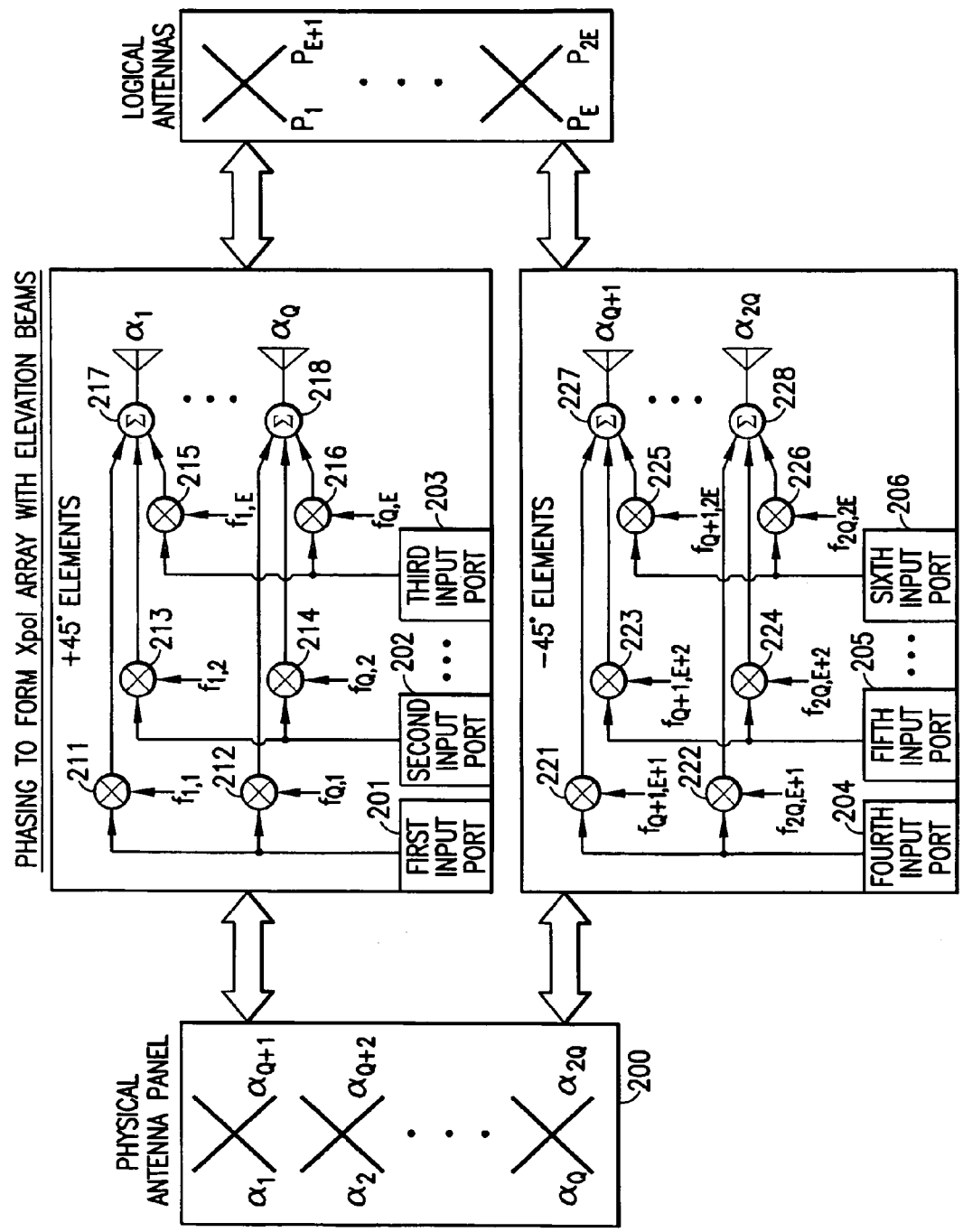
FIG. 2 is a block diagram of a second exemplary antenna panel phasing configuration suitable for use with the instant invention.

FIG. 2 is a block diagram of a second exemplary cross-polarized (XPOL) phased antenna panel 200 suitable for use with the instant invention wherein each elevation beam for a given polarization is formed using all the elements of that polarization. Rather than forming a single elevation beam per polarization as shown in FIG. 1, the antenna panel 200 of FIG. 2 forms a plurality of elevation beams for each of a plurality of polarizations. For purposes of illustration, these polarizations may include a +45° polarization and a −45° polarization both defined with reference to the horizontal plane. However, polarization angles other than +45° and −45° may be employed in conjunction with the antenna panel 200 described herein.

The antenna panel 200 includes a total of 2Q elements $\alpha_1, \alpha_2 \ldots \alpha_Q$ and $\alpha_{Q+1}, \alpha_{Q+2} \ldots \alpha_{2Q}$ wherein Q is a positive integer greater than one. Q elements are provided for each polarization, such that a first plurality of Q elements $\alpha_1, \alpha_2 \ldots \alpha_Q$ are used for the +45° polarization and a second plurality of Q elements $\alpha_{Q+1}, \alpha_{Q+2} \ldots \alpha_{2Q}$ are used for the −45° polarization. A first plurality of elevation beams are formed from the first plurality of Q elements $\alpha_1, \alpha_2 \ldots \alpha_Q$ and a second plurality of elevation beams are formed from the second plurality of Q elements $\alpha_{Q+1}, \alpha_{Q+2} \ldots \alpha_{2Q}$, thereby providing the same number of elevation beams for the +45° polarization and the −45° polarization. Each beam belonging to the first plurality of elevation beams is preferably designed to be substantially orthogonal to all other beams of the first plurality of elevation beams. Similarly, each beam belonging to the second plurality of elevation beams is preferably designed to be orthogonal to all other beams of the second plurality of elevation beams.

The first plurality and second plurality of elevation beams are formed using multi-beam phasing. The first plurality of Q elements $\alpha_1, \alpha_2 \ldots \alpha_Q$ are phased to form a plurality of logical +45° antennas $P_1$-$P_E$ arranged in the vertical dimension. Likewise, the second plurality of Q elements $\alpha_{Q+1}$, $\alpha_{Q+2}$ ... $\alpha_{2Q}$ are phased to form a plurality of logical -45° antennas $P_{E+1}$-$P_{2E}$ arranged in the vertical dimension. Each of the first plurality of elevation beams is formed using all elements of the first plurality of Q elements $\alpha_1$, $\alpha_2$ ... $\alpha_Q$, and each of the second plurality of elevation beams is formed using all elements of the second plurality of Q elements $\alpha_{Q+1}$, $\alpha_{Q+2}$ ... $\alpha_{2Q}$. Thus, each elevation beam for a given polarization, such as the +45° polarization or the -45° polarization, is formed using all Q elements of that polarization.

The XPOL panel 200 forms a logical E×2 vertical array of cross-polarized elements including the plurality of logical +45° antennas $P_1$-$P_E$ and the plurality of logical -45° antennas $P_{E+1}$-$P_{2E}$. E is an integer representing the quantity of elevation beams included in the first plurality of elevation beams. Since the first plurality of elevation beams includes the same number of beams as the second plurality of elevation beams, E also represents the quantity of elevation beams included in the second plurality of elevation beams. Thus, the antenna panel 200 forms E beams from Q elements for each polarization.

The plurality of logical +45° antennas $P_1$-$P_E$ are implemented using a first input port 201, a second input port 202, and a third input port 203. Similarly, the plurality of logical -45° antennas $P_{E+1}$-$P_{2E}$ are implemented using a fourth input port 204, a fifth input port 205, and a sixth input port 206. The first input port 201 is connected to a first input of a first multiplier 211 and a first input of a second multiplier 212. The second input port 202 is connected to a first input of a third multiplier 213 and a first input of a fourth multiplier 214. The third input port 203 is connected to a first input of a fifth multiplier 215 and a first input of a sixth multiplier 216. A first transmit (Tx) weight $f_{1,1}$ is applied to a second input of the first multiplier 211. A second Tx weight $f_{Q,1}$ is applied to a second input of the second multiplier 212. A third Tx weight $f_{1,2}$ is applied to a second input of the third multiplier 213. A fourth Tx weight $f_{Q,2}$ is applied to a second input of the fourth multiplier 214. A fifth transmit Tx weight $f_{1,E}$ is applied to a second input of the fifth multiplier 215. A sixth Tx weight $f_{Q,E}$ is applied to a second input of the sixth multiplier 216.

An output of the first multiplier 211 is connected to a first input of a first summer 217. An output of the third multiplier 213 is connected to a second input of the first summer 217. An output of the fifth multiplier 215 is connected to a third input of the first summer 217. An output of the first summer 217 is connected to the element $\alpha_1$. An output of the second multiplier 212 is connected to a first input of a second summer 218. An output of the fourth multiplier 214 is connected to a second input of the second summer 218. An output of the sixth multiplier 216 is connected to a third input of the second summer 218. An output of the second summer 218 is connected to the element $\alpha_Q$.

As indicated previously, the plurality of logical -45° antennas $P_{E+1}$-$P_{2E}$ are implemented using the fourth input port 204, the fifth input port 205, and the sixth input port 206. The fourth input port 204 is connected to a first input of a seventh multiplier 221 and a first input of an eighth multiplier 222. The fifth input port 205 is connected to a first input of a ninth multiplier 223 and a first input of a tenth multiplier 224. The sixth input port 206 is connected to a first input of an eleventh multiplier 225 and a first input of a twelfth multiplier 226. A seventh Tx weight $f_{Q+1,E+1}$ is applied to a second input of the seventh multiplier 221. An eighth Tx weight $f_{2Q,E+1}$ is applied to a second input of the eighth multiplier 222. A ninth Tx weight $f_{Q+1,E+2}$ is applied to a second input of the ninth multiplier 223. A tenth Tx weight $f_{2Q,E+2}$ is applied to a second input of the tenth multiplier 224. An eleventh transmit Tx weight $f_{Q+1,\,2E}$ is applied to a second input of the eleventh multiplier 225. A twelfth Tx weight $f_{2Q,2E}$ is applied to a second input of the twelfth multiplier 226.

An output of the seventh multiplier 221 is connected to a first input of a third summer 227. An output of the ninth multiplier 223 is connected to a second input of the third summer 227. An output of the eleventh multiplier 225 is connected to a third input of the third summer 227. An output of the third summer 227 is connected to the element $\alpha_{Q+1}$. An output of the eighth multiplier 222 is connected to a first input of a fourth summer 228. An output of the tenth multiplier 224 is connected to a second input of the fourth summer 228. An output of the twelfth multiplier 226 is connected to a third input of the fourth summer 228. An output of the fourth summer 228 is connected to the element $\alpha_{2Q}$.

FIG. 3 is a block diagram of a third exemplary cross-polarized (XPOL) phased antenna panel 300 suitable for use with the instant invention wherein each beam for a given polarization uses a non-overlapping subset of elements. Rather than forming a single elevation beam per polarization as shown in FIG. 1, the antenna panel 300 of FIG. 3 forms a plurality of elevation beams for each of a plurality of polarizations. As indicated previously, for purposes of illustration, these polarizations may include a +45° polarization and a -45° polarization both defined with reference to the horizontal plane. However, polarization angles other than +45° and -45° may be employed in conjunction with the antenna panel 300 described herein The antenna panel 300 includes Q elements for each polarization wherein Q is a positive integer greater than one. For purposes of illustration, Q=6 in the example of FIG. 3, but any number of elements greater than or equal to two may be employed. A first plurality of Q elements $\alpha_1$, $\alpha_2$ $\alpha_3$, $\alpha_4$, $\alpha_5$, and $\alpha_6$ are used for the +45° polarization and a second plurality of Q elements $\alpha_7$, $\alpha_8$, $\alpha_9$, $\alpha_{10}$, $\alpha_{11}$, and $\alpha_{12}$ are used for the -45° polarization. A first elevation beam is formed from a first subset of the first plurality of Q elements $\alpha_1$, $\alpha_2$ $\alpha_3$, $\alpha_4$, $\alpha_5$, and $\alpha_6$, and a second elevation beam is formed from a second subset of the first plurality of Q elements $\alpha_1$, $\alpha_2$ $\alpha_3$, $\alpha_4$, $\alpha_5$, and $\alpha_6$. The first and second subsets of the first plurality of Q elements $\alpha_1$, $\alpha_2$ $\alpha_3$, $\alpha_4$, $\alpha_5$, and $\alpha_6$, are selected to be non-overlapping. Similarly, a third elevation beam is formed from a first subset of the second plurality of Q elements $\alpha_7$, $\alpha_8$ $\alpha_9$, $\alpha_{10}$, $\alpha_{11}$, and $\alpha_{12}$, and a fourth elevation beam is formed from a second subset of the second plurality of Q elements $\alpha_7$, $\alpha_8$, $\alpha_9$, $\alpha_{10}$, $\alpha_{11}$, and $\alpha_{12}$. The first and second subsets of the second plurality of Q elements $\alpha_7$, $\alpha_8$, $\alpha_9$, $\alpha_{10}$, $\alpha_{11}$, and $\alpha_{12}$ are selected to be non-overlapping.

In the illustrative example of FIG. 3, a first subset of the first plurality of Q elements $\alpha_1$, $\alpha_2$ $\alpha_3$, $\alpha_4$, $\alpha_5$, and $\alpha_6$, is selected to include the elements $\alpha_1$ and $\alpha_2$. These elements $\alpha_1$ and $\alpha_2$ comprise a first logical antenna P1. A second subset of the first plurality of Q elements $\alpha_1$, $\alpha_2$ $\alpha_3$, $\alpha_4$, $\alpha_5$, and $\alpha_6$, is selected to include the elements $\alpha_3$ and $\alpha_4$. These elements $\alpha_3$ and $\alpha_4$ comprise a second logical antenna P2. A third subset of the first plurality of Q elements $\alpha_1$, $\alpha_2$ $\alpha_3$, $\alpha_4$, $\alpha_5$, and $\alpha_6$, is selected to include the elements $\alpha_5$ and $\alpha_6$. These elements $\alpha_5$ and $\alpha_6$ comprise a third logical antenna P3. Likewise, a first subset of the second plurality of Q elements $\alpha_7$, $\alpha_8$ $\alpha_9$, $\alpha_{10}$, $\alpha_{11}$, and $\alpha_{12}$, is selected to include the elements $\alpha_7$ and $\alpha_8$. These elements $\alpha_7$ and $\alpha_8$ comprise a fourth logical antenna P4. A second subset of the second plurality of Q elements $\alpha_7$, $\alpha_8$ $\alpha_9$, $\alpha_{10}$, $\alpha_{11}$, and $\alpha_{12}$, is selected to include the elements $\alpha_9$ and $\alpha_{10}$. These elements $\alpha_9$ and $\alpha_{10}$ comprise a fifth logical antenna P5. A third subset of the second plurality of Q elements $\alpha_7$, $\alpha_8$ $\alpha_9$, $\alpha_{10}$, $\alpha_{11}$, and $\alpha_{12}$, is selected to include the elements $\alpha_{11}$ and $\alpha_{12}$. These elements $\alpha_{12}$ and $\alpha_{12}$ comprise a sixth logical antenna P6.

Each of the first, second, third, fourth, fifth, and sixth logical antennas P1, P2, P3, P4, P5, and P6 is used to form a corresponding elevation beam. The first, second, and third logical antennas P1, P2, and P3 form a total of three elevation beams corresponding to the +45° polarization. Similarly, the fourth, fifth, and sixth logical antennas P4, P5, and P6 form a total of three elevation beams corresponding to the −45° polarization. The elevation beams formed for the +45° polarization are orthogonal to each other since the elevation beams are formed from non-overlapping subsets of the underlying antenna elements. Similarly, the elevation beams formed for the −45° polarization are orthogonal to each other since the elevation beams are formed from non-overlapping subsets of the underlying antenna elements. In this manner, the antenna panel 300 provides a 3×2 XPOL logical array in the vertical dimension.

The first logical antenna P1 is implemented using a first input port 301. Similarly, the second logical antenna P2 is implemented using a second input port 302, the third logical antenna P3 is implemented using a third input port 303, the fourth logical antenna P4 is implemented using a fourth input port 304, the fifth logical antenna P5 is implemented using a fifth input port 305, and the sixth logical antenna P6 is implemented using a sixth input port 306. The first input port 301 is connected to a first input of a first multiplier 311 and a first input of a second multiplier 312. A first Tx weight $f_{1,1}$ is applied to a second input of the first multiplier 311, and a second Tx weight $f_{2,1}$ is applied to a second input of the second multiplier 312.

Similarly, the second input port 302 is connected to a first input of a third multiplier 313 and a first input of a fourth multiplier 314. A third Tx weight $f_{3,2}$ is applied to a second input of the third multiplier 313, and a fourth Tx weight $f_{4,2}$ is applied to a second input of the fourth multiplier 314. The third input port 303 is connected to a first input of a fifth multiplier 315 and a first input of a sixth multiplier 316. A fifth Tx weight $f_{5,3}$ is applied to a second input of the fifth multiplier 315, and a sixth Tx weight $f_{6,3}$ is applied to a second input of the sixth multiplier 312. The fourth input port 304 is connected to a first input of a seventh multiplier 317 and a first input of an eighth multiplier 318. A seventh Tx weight $f_{7,6}$ is applied to a second input of the seventh multiplier 317, and an eighth Tx weight $f_{8,4}$ is applied to a second input of the eighth multiplier 318. The fifth input port 305 is connected to a first input of a ninth multiplier 319 and a first input of a tenth multiplier 320. A ninth Tx weight $f_{9,5}$ is applied to a second input of the ninth multiplier 319, and a tenth Tx weight $f_{10,5}$ is applied to a second input of the tenth multiplier 320. The sixth input port 306 is connected to a first input of an eleventh multiplier 321 and a first input of a twelfth multiplier 322. An eleventh Tx weight $f_{11,6}$ is applied to a second input of the eleventh multiplier 321, and a twelfth Tx weight $f_{12,6}$ is applied to a second input of the twelfth multiplier 322.

An output of the first multiplier 311 is connected to the element $\alpha_1$. Likewise, an output of the second multiplier 312 is connected to the element $\alpha_2$, an output of the third multiplier 313 is connected to the element $\alpha_3$, an output of the fourth multiplier 314 is connected to the element $\alpha_4$, an output of the fifth multiplier 315 is connected to the element $\alpha_5$, an output of the sixth multiplier 316 is connected to the element $\alpha_6$, an output of the seventh multiplier 317 is connected to the element $\alpha_7$, an output of the eighth multiplier 318 is connected to the element $\alpha_8$, an output of the ninth multiplier 319 is connected to the element $\alpha_9$, an output of the tenth multiplier 320 is connected to the element $\alpha_{10}$, an output of the eleventh multiplier 321 is connected to the element $\alpha_{11}$, and an output of the twelfth multiplier 312 is connected to the element $\alpha_{12}$.

The configuration of FIG. 3 uses fewer parts than the configuration shown in FIG. 2. FIG. 3 does not require the use of a combiner or summer into any of the elements $\alpha_1$, $\alpha_2$, etc., and may thus be advantageous in the context of certain system applications.

According to a further embodiment of the invention, any of the configurations, previously described with reference to FIGS. 2-3 may be used to provide a system that includes more than one antenna panel 200 or 300. For example, FIG. 4 shows an illustrative panel configuration that employs a first panel 501 and a second panel 502. The first panel 501 and the second panel 502 may each be implemented using the antenna panel 300 configuration described in conjunction with FIG. 3. Thus, an antenna array at a base station Node B (eNB) may include a plurality of panels, such as the first panel 501 and the second panel 502, for providing radiation pattern control in the azimuthal dimension as well as the elevational dimension.

In the example of FIG. 4, the first and second panels 501, 502 are both XPOL panels that each include E=3 logical cross-polarized antenna arrays in the vertical dimension. The first panel 501 includes three logical antennas A1, B1, and C1 at a first polarization, as well as three logical antennas A2, B2, and C2 at a second polarization orthogonal to the first polarization. Similarly, the second panel 502 includes three logical antennas A3, B3, C3 at the first polarization and three logical antennas A4, B4, and C4 at the second polarization. The configuration of FIG. 4 may use, for example, six transceivers for the first panel 501 and six transceivers for the second panel 502.

Figure 5A:
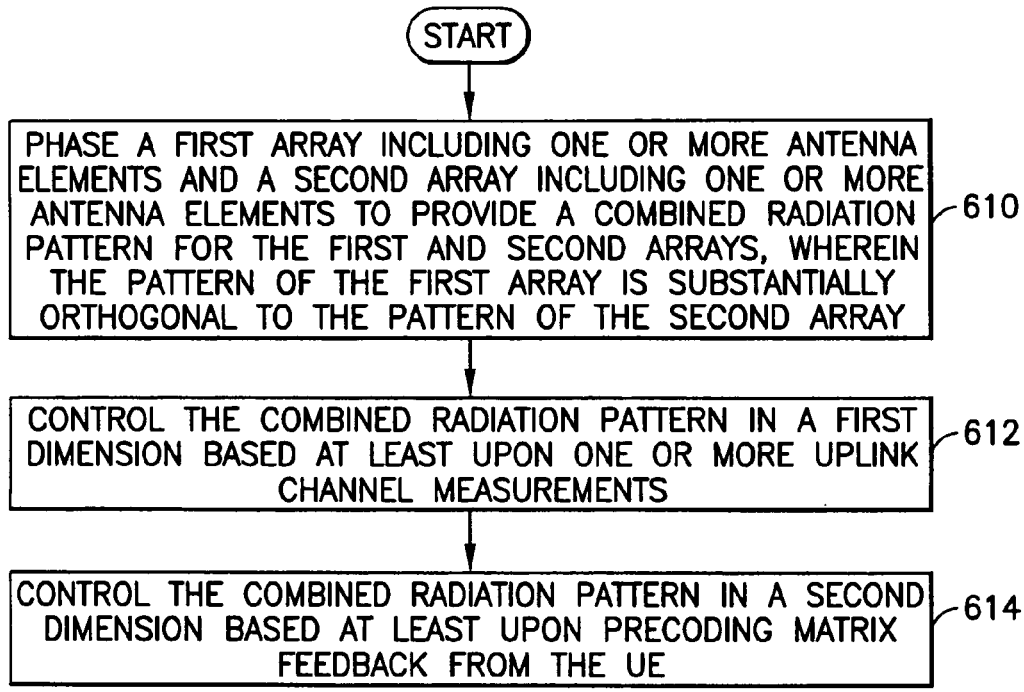
FIG. 5A is a block diagram of a first exemplary antenna phasing method for use with any of the configurations shown in FIGS. 2-4.

FIG. 5A is a flowchart describing an exemplary method for using any of the configurations shown in FIGS. 2-4 to provide beamforming in two different dimensions such as, for example, the vertical (elevational) dimension and the horizontal (azimuthal) dimension. The operational sequence begins at block 610 where a first array including one or more antenna elements and a second array including one or more antenna elements are phased to provide a combined radiation pattern for the first and second arrays, wherein the first array has a first radiation pattern and the second array has a second radiation pattern, and wherein the first radiation pattern is substantially orthogonal to the second radiation pattern. At block 612, the combined radiation pattern is controlled in a first dimension based at least upon one or more uplink (UL) channel measurements. At block 614, the combined radiation pattern is controlled in a second dimension based at least upon a precoder matrix index (PMI) feedback. As known in the art, PMI feedback is an indication sent to the eNB from the UE that indicates which vector (or matrix) the eNB should use for beamforming (in the second dimension, e.g., the azimuthal direction). Note that blocks 610, 612 and 614 may be performed simultaneously or in any order. Also note that other feedback from the UE can be used in place of PMI feedback such as covariance matrix feedback, eigenvector feedback, or channel feedback.

Figure 5B:
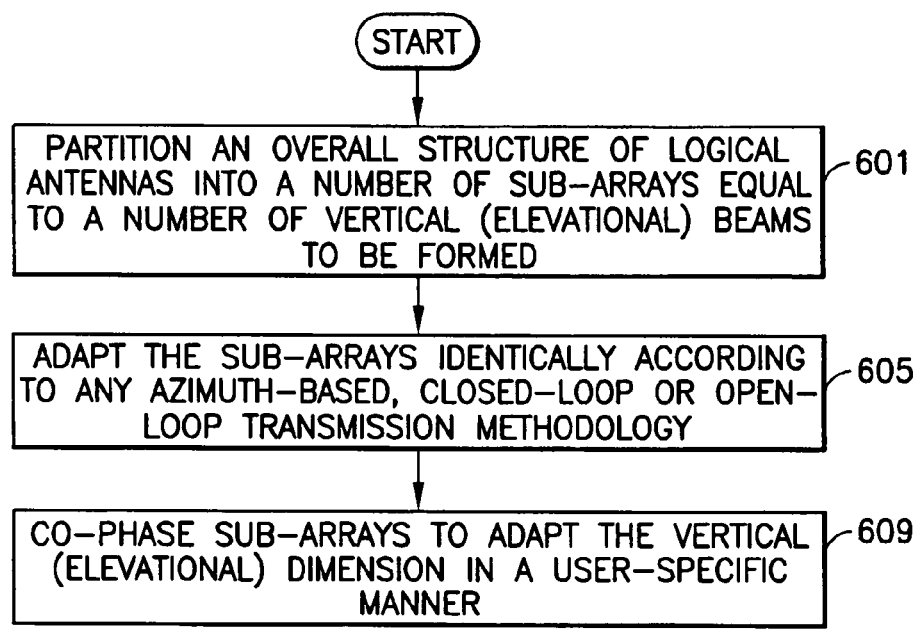
FIG. 5B is a block diagram of a second exemplary antenna phasing method for use with any of the configurations shown in FIGS. 2-4.

FIG. 5B is a flowchart describing an exemplary method for using any of the configurations shown in FIGS. 2-4 to provide user-specific beamforming in the vertical (elevational) dimension. Advantageously, vertical beamforming as disclosed herein may be performed in conjunction with existing azimuth-based closed-loop transmission methods that are described, for example, in a standard called Long Term Evolution (LTE). LTE was developed by the $3^{rd}$ Generation Partnership Project and is described within the 36-series of the 3GPP Specification as Technical Standard (TS) 36.101 et seq. LTE is a standard for wireless communication of high-speed data for mobile phones and data terminals.

The operational sequence of FIG. 5B commences at block 601 where an overall structure of logical antennas is partitioned into a number of sub-arrays equal to a quantity of vertical beams to be formed. Illustratively, the overall structure of logical antennas may include the first and second panels 501, 502 of FIG. 4. For example, if E=3 vertical beams are to be formed, then the overall structure of logical antennas is partitioned into three sub-arrays designated as Array A (consisting of logical antennas A1, A2, A3, A4 in FIG. 5.), Array B (consisting of logical antennas B1, B2, B3, B4 in FIG. 5.), and Array C (consisting of logical antennas C1, C2, C3, C4 in FIG. 5.).

The operational sequence of FIG. 5B continues at block 605 where the sub-arrays (in this example, Array A, Array B, and Array C) are adapted identically according to any azimuth-based, closed-loop or open-loop transmission methodology (e.g., a LTE compliant closed- or open-loop methodology). Next, at block 609, the sub-arrays A, B, and C are co-phased to adapt the overall vertical (elevation) dimension in a user-specific manner. However, pursuant to an alternate embodiment of the invention, block 605 may be performed in the vertical (elevational) dimension instead of the horizontal (azimuthal) dimension, and block 609 may be performed in the horizontal (azimuthal) dimension instead of the vertical (elevational) dimension.

Figure 6A:
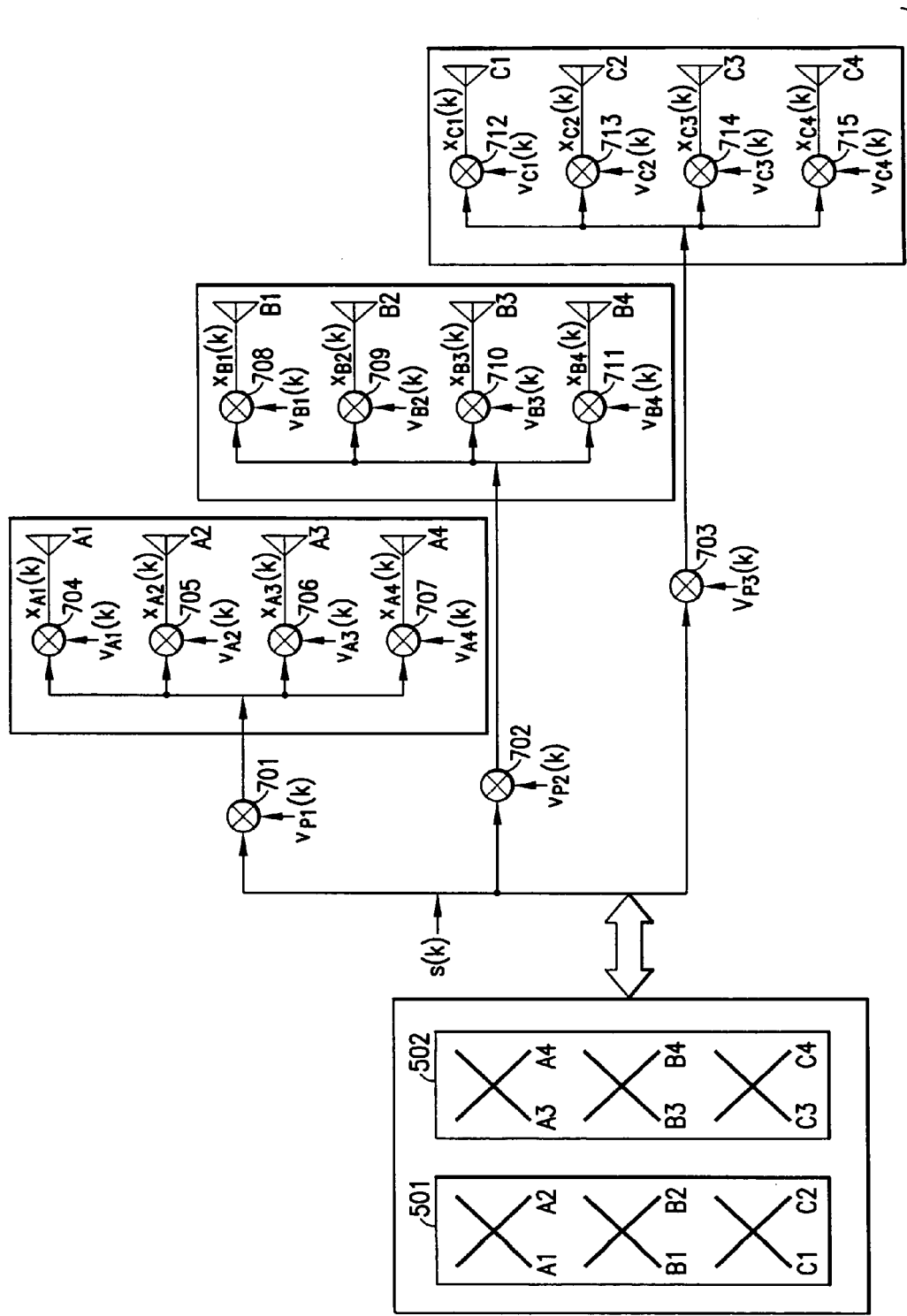
FIG. 6A is a block diagram of an illustrative antenna phasing configuration for providing rank-1 single user multiple input multiple output (SU-MIMO) transmission.

FIG. 6A is a block diagram of an illustrative antenna phasing configuration for providing rank-1 single user multiple input multiple output (SU-MIMO) transmission. This configuration employs the first and second panels 501, 502 previously described in conjunction with FIG. 4. The first and second panels 501, 502 (FIGS. 4 and 6A) are organized into a plurality of sub-arrays. Each respective sub-array of the plurality of sub-arrays will provide a corresponding elevation beam. For example, the use of three sub-arrays will provide E=3 different elevation beams. In the example of FIG. 6A, a first sub-array, Array A, includes logical antennas A1 and A2 of the first panel 501, as well as logical antennas A3 and A4 of the second panel 502. Similarly, a second sub-array, Array B, includes logical antennas B1 and B2 of the first panel 501, as well as logical antennas B3 and B4 of the second panel 502. Likewise, a third sub-array, Array C, includes logical antennas C1 and C2 of the first panel 501, as well as logical antennas C3 and C4 of the second panel 502. Thus, Array A, Array B, and Array C each include M=4 logical elements wherein each logical element constitutes an LTE antenna port.

An input stream s(k) is weighted for the vertical (elevational) dimension using one or more multipliers. For example, a first multiplier 701, a second multiplier 702, and a third multiplier 703 are used to apply co-phasing weights from an [E×1] co-phasing weight vector $V_p$ to the input stream s(k). The [E×1] co-phasing weight vector Vp is chosen to adapt the radiation pattern formed from the first and second panels 501, 502 in the vertical (elevational) dimension. In the present example, E=3, and thus, the co-phasing weight vector is [3×1]. A first co-phasing weight $V_{P1}(k)$ from the co-phasing weight vector Vp is applied to a second input of the first multiplier 701. A second co-phasing weight $V_{P2}(k)$ from the co-phasing weight vector Vp is applied to a second input of the second multiplier 702. A third co-phasing weight $V_{P3}(k)$ from the co-phasing weight vector $V_P$ is applied to a second input of the third multiplier 703.

After the input stream s(k) is weighted with the [E×1] co-phasing weight vector $V_P$ to provide weighting for the vertical (elevational) dimension, the stream is then weighted for the horizontal (azimuthal) dimension. Weighting for the horizontal dimension may be accomplished by applying azimuthal weights to one or more multipliers. For example, an output of the first multiplier 701, representing a first elevationally weighted output, is connected to a first input of a fourth multiplier 704, a first input of a fifth multiplier 705, a first input of a sixth multiplier 706, and a first input of a seventh multiplier 707. Similarly, an output of the second multiplier 702, representing a second elevationally weighted output, is connected to a first input of an eighth multiplier 708, a first input of a ninth multiplier 709, a first input of a tenth multiplier 710, and a first input of an eleventh multiplier 711. Likewise, an output of the third multiplier 703, representing a third elevationally weighted output, is connected to a first input of a twelfth multiplier 712, a first input of a thirteenth multiplier 713, a first input of a fourteenth multiplier 714, and a first input of a fifteenth multiplier 715.

An [M×1] azimuthal weight vector $V_A$ for Array A, comprising A1, A2, A3, and A4, is chosen to adapt the radiation pattern of the first and second panels 501, 502 in the horizontal (azimuthal) dimension. Similarly, an M×1 azimuthal weight vector $V_B$ for Array B, comprising B1, B2, B3, and B4, is chosen to adapt the radiation pattern of the first and second panels 501, 502 in the horizontal (azimuthal) dimension. Likewise, an M×1 azimuthal weight vector $V_C$ for Array C, comprising C1, C2, C3, and C4, is chosen to adapt the radiation pattern of the first and second panels 501, 502 in the horizontal (azimuthal) dimension. In the present example, M=4, and thus, each weight vector $V_A$, $V_B$, and $V_C$ is [4×1].

A first weight $V_{A1}(k)$ from the weight vector $V_A$ is applied to a second input of the fourth multiplier 704. A second weight $V_{A2}(k)$ from the weight vector $V_A$ is applied to a second input of the fifth multiplier 705. A third weight $V_{A3}(k)$ from the weight vector $V_A$ is applied to a second input of the sixth multiplier 706. A fourth weight $V_{A4}(k)$ from the weight vector $V_A$ is applied to a second input of the seventh multiplier 707.

Likewise, a first weight $V_{B1}(k)$ from the weight vector $V_B$ is applied to a second input of the eighth multiplier 708. A second weight $V_{B2}(k)$ from the weight vector $V_B$ is applied to a second input of the ninth multiplier 709. A third weight $V_{B3}(k)$ from the weight vector $V_B$ is applied to a second input of the tenth multiplier 710. A fourth weight $V_{B4}(k)$ from the weight vector $V_B$ is applied to a second input of the eleventh multiplier 711. Similarly, a first weight $V_{C1}(k)$ from the weight vector $V_C$ is applied to a second input of the twelfth multiplier 712. A second weight $V_{C2}(k)$ from the weight vector $V_C$ is applied to a second input of the thirteenth multiplier 713. A third weight $V_{C3}(k)$ from the weight vector $V_C$ is applied to a second input of the fourteenth multiplier 714. A fourth weight $V_{C4}(k)$ from the weight vector $V_C$ is applied to a second input of the fifteenth multiplier 715.

An output of the fourth multiplier 704, representing a first elevationally-weighted and azimuthally-weighted stream, is connected to the logical antenna A1. An output of the fifth multiplier 705, representing a second elevationally-weighted and azimuthally-weighted stream, is connected to the logical antenna A2. An output of the sixth multiplier 706, representing a third elevationally-weighted and azimuthally-weighted stream, is connected to the logical antenna A3. An output of the seventh multiplier 707, representing a fourth elevationally-weighted and azimuthally-weighted stream, is connected to the logical antenna A4. In an analogous manner, an output of the eighth multiplier 708 is connected to the logical antenna B1, an output of the ninth multiplier 709 is connected to the logical antenna B2, an output of the tenth multiplier 710 is connected to the logical antenna B3, an output of the eleventh multiplier 711 is connected to the logical antenna B4, an output of the twelfth multiplier 712 is connected to the logical antenna C1, an output of the thirteenth multiplier 713 is connected to the logical antenna C2, an output of the fourteenth multiplier 714 is connected to the logical antenna C3, and an output of the fifteenth multiplier 715 is connected to the logical antenna C4. It is important to note that the components and configuration shown in FIG. 6A can be implemented digitally via baseband signal processing and not necessarily with discrete components.

Figure 6B:
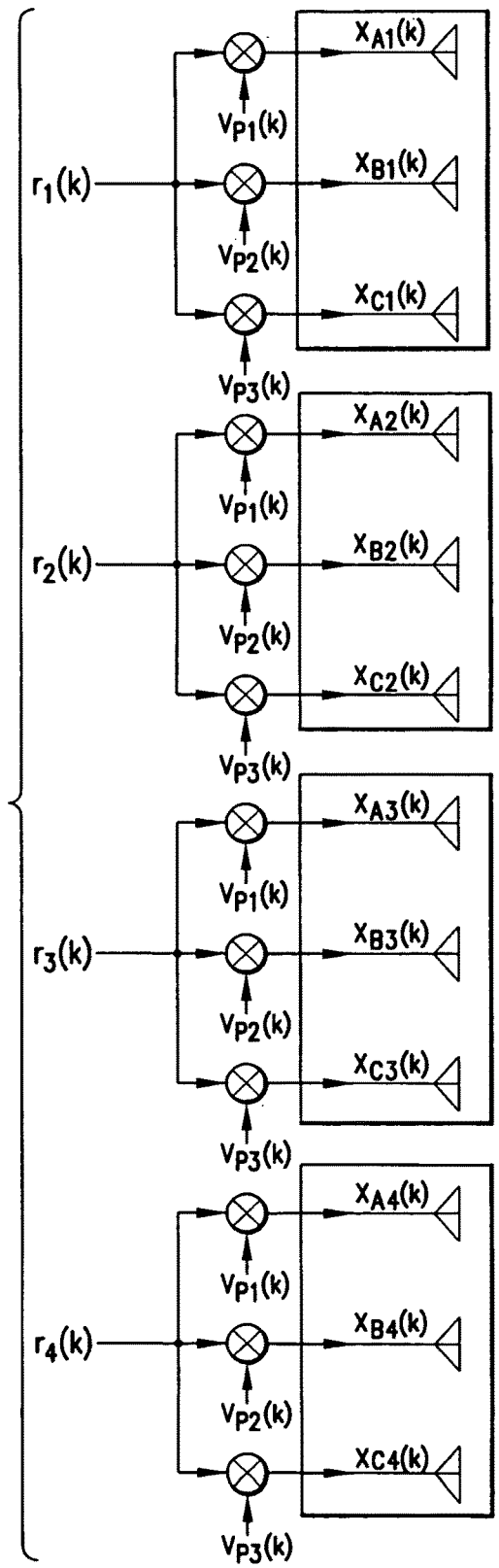
FIG. 6B is a block diagram of an exemplary antenna phasing method for use in transmitting common reference signals (CRS).

FIG. 6B is a block diagram of an exemplary antenna phasing method for use in transmitting common reference signals (CRS). FIG. 6B shows an example where the ith element in each of the three sub-arrays (A,B,C) are co-phased together to transmit the ith CRS signal $r_i[k]$. A first plurality of logical antennas A1, B1, and C1 are co-phased together with a set of co-phasing weights $V_{p1}[k]$, $V_{p2}[k]$ and $V_{p3}[k]$ to transmit a first CRS signal $r_1[k]$. A second plurality of logical antennas A2, B2, and C2 are co-phased together with the set of co-phasing weights $V_{p1}[k]$, $V_{p2}[k]$, and $V_{p3}[k]$ to transmit a second CRS signal $r_2[k]$. A third plurality of logical antennas A3, B3, and C3 are co-phased together with the set of co-phasing weights $V_{p1}[k]$, $V_{p2}[k]$, and $V_{p3}[k]$ to transmit a third CRS signal $r_3[k]$. A fourth plurality of logical antennas A4, B4, and C4 are co-phased together with the set of co-phasing weights $V_{p1}[k]$, $V_{p2}[k]$, and $V_{p3}[k]$ to transmit a fourth CRS signal $r_4[k]$.

Figure 7A:
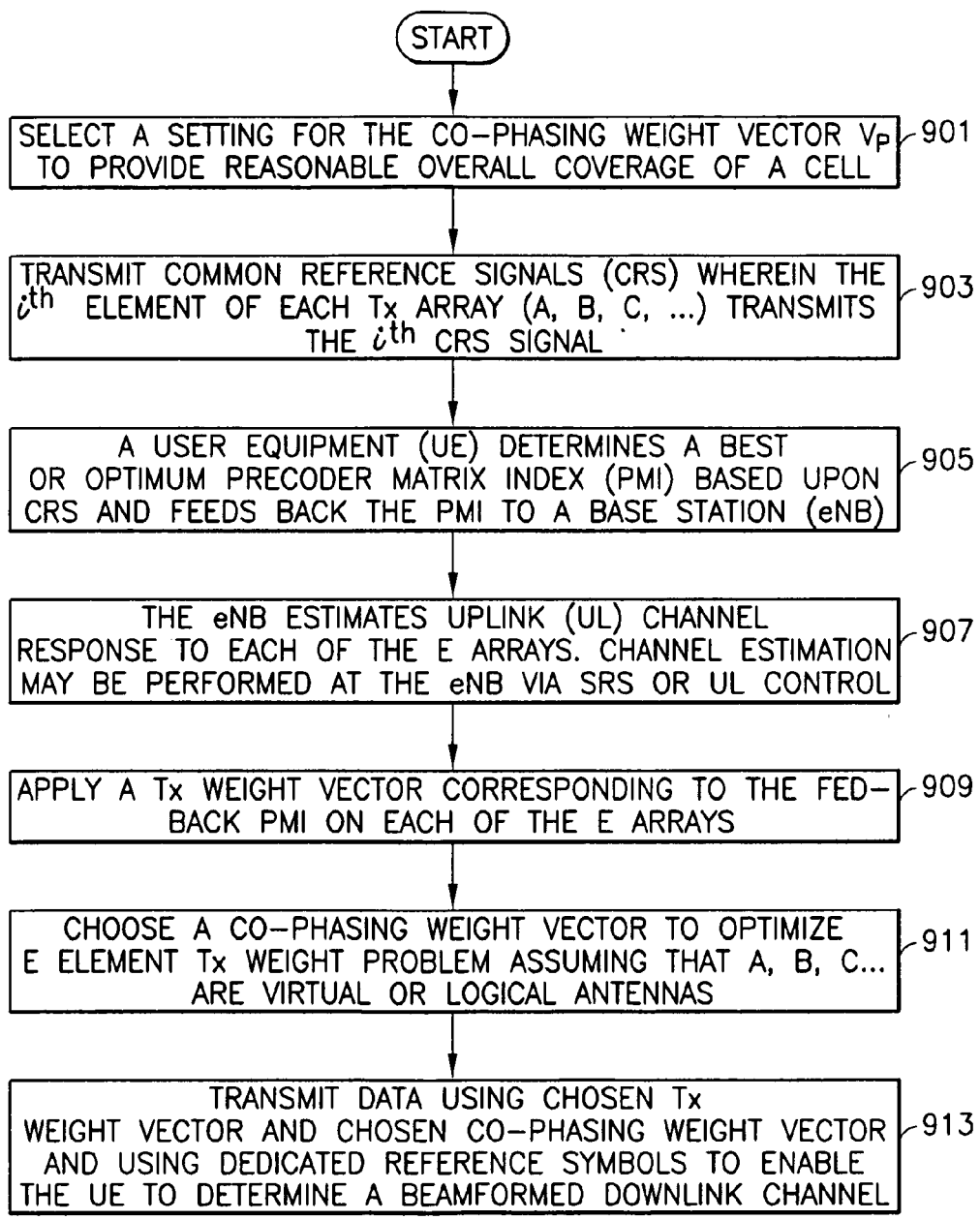
FIG. 7A comprises a block diagram of a third exemplary antenna phasing method for use with any of the configurations shown in FIGS. 6A, 6B, and 8.

FIG. 7A comprises a block diagram of an exemplary antenna phasing method for use with any of the configurations shown in FIG. 6A, 6B, (and FIG. 8, described hereinafter). The operational sequence commences at block 901 (FIG. 7A) where a setting is selected for the co-phasing weight vector Vp that provides reasonable overall coverage of a cell. At block 903, common reference signals (CRS) are transmitted according to the exemplary configuration shown in FIG. 6B, such that the ith element of each Tx array (A, B, C, ...) transmits the ith CRS signal, where the co-phasing weight vector Vp is used to elevationally beamform the ith CRS signal using the ith element of each Tx array (A, B, C). Then at block 905 (FIG. 7A), a user equipment (UE) determines a best or optimum PMI based upon CRS and feeds back the PMI to a base station (eNB).

The operational sequence continues to block 907 where the eNB estimates an uplink (UL) channel response to all of the antennas in each of the E arrays. Channel estimation may be performed at the eNB via SRS or via other UL transmissions from the UE (such as data or control). Next, apply the Tx weight vector corresponding to the fed-back PMI on each of the E arrays (block 909). If using another method of feedback than PMI-based feedback (such as channel or covariance feedback), then the Tx weight vector would be calculated by the eNB from the particular feedback (e.g., as the dominant eigenvector of the covariance matrix). The co-phasing weight vector is chosen to optimize an E element Tx weight problem, assuming that arrays A, B, C . . . are virtual or logical antennas (block 911). Transmit data using chosen Tx weight vector and chosen co-phasing weight vector and using dedicated reference signals to enable the UE to determine a beamformed downlink channel (block 913). As known in the art, dedicated reference signals are pilot symbols which are beamformed in a user-specific way along with the data for the particular user.

Figure 7B:
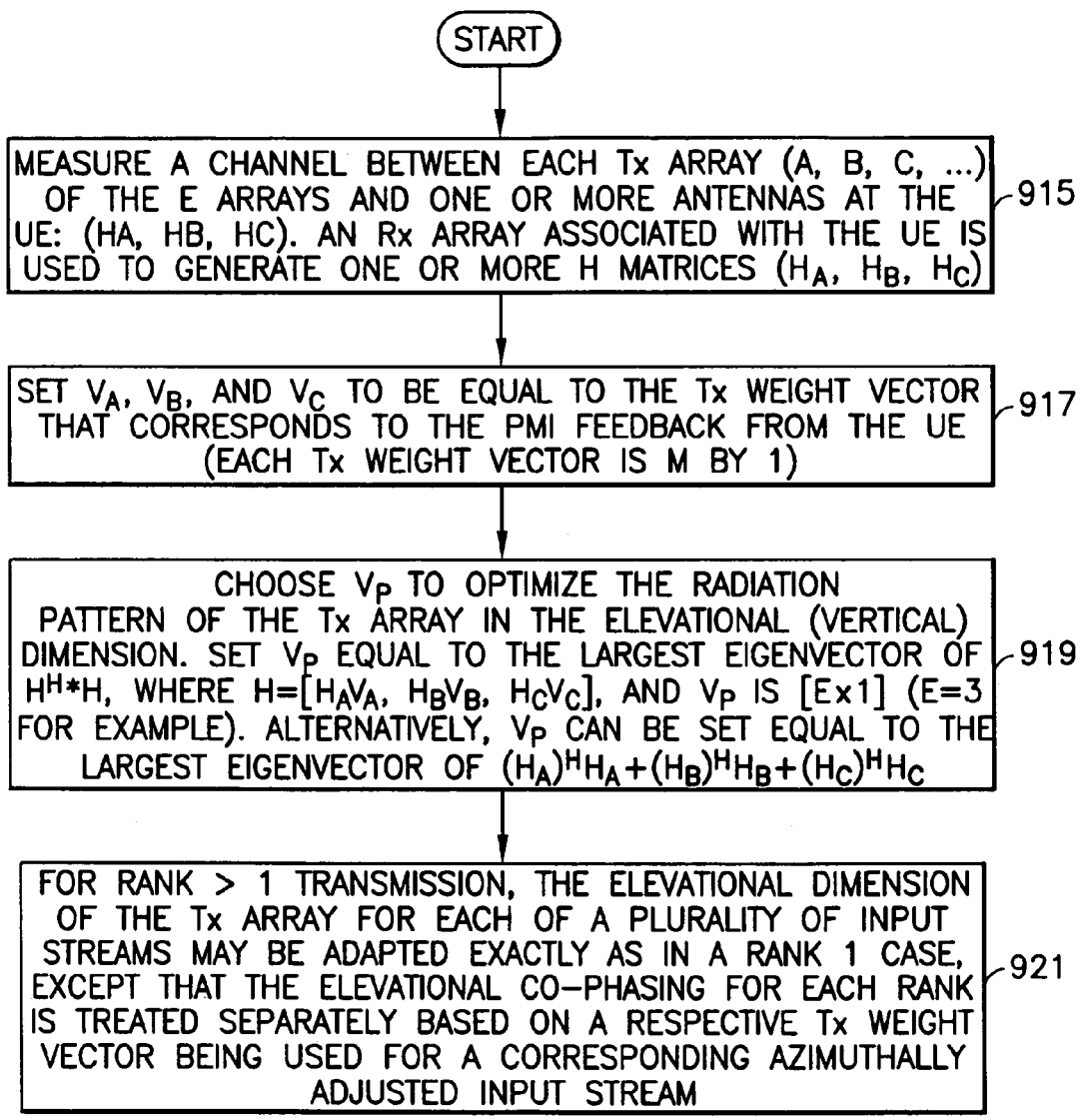
FIG. 7B comprises a block diagram of a fourth exemplary antenna phasing method for use with any of the configurations shown in FIGS. 6A, 6B, and 8, or with the method of FIG. 7A.
Figure 8:
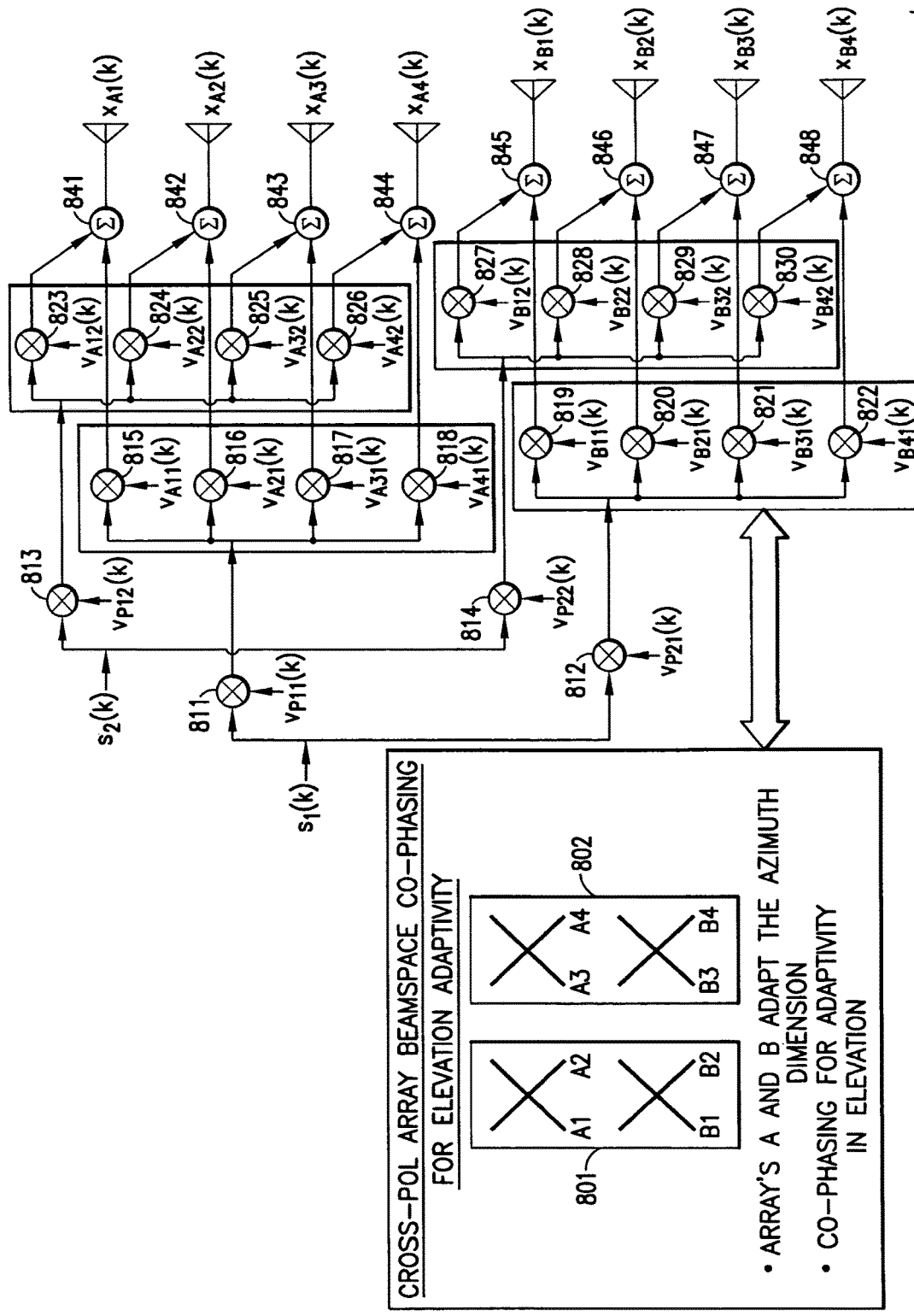
FIG. 8 is a block diagram of a sixth exemplary antenna panel phasing configuration suitable for use with the instant invention.

FIG. 7B shows a block diagram of an exemplary antenna phasing method for use with any of the configurations shown in FIG. 6A, 6B, and FIG. 8, or with the method of FIG. 7A. FIG. 7B commences at block 915 where a channel is measured between each Tx array (A, B, C . . . ) of the E arrays and one or more antennas at the UE: (HA, HB, HC . . . ). The channel between each Tx array (A, B, C . . . ) of the E arrays and an Rx array associated with the UE is mathematically captured in a matrix or a plurality of matrices $H_A$, $H_B$, and $H_C$. The base station (eNB) may have knowledge of a $N_{RX}$ by M channel matrix where $N_{RX}$ specifies a quantity of receive antennas at the UE and M represents a quantity of logical antennas in the each of the sub-arrays A, B, C. Otherwise, if a sounding reference signal (SRS) is transmitted from a UE with a single Tx, then $H_A$, $H_B$, and $H_C$ are all matrices of [1×M], and therefore the eNB has at least partial knowledge of the entire $N_{RX}$ by M channel matrix (block 915) for the sub-arrays A,B,C. Next, $V_A$, $V_B$, and $V_C$ are set to be equal to the Tx weight vector that corresponds to the PMI feedback from the UE. Each Tx weight vector is [M×1] (block 917). Alternatively, $V_A$, $V_B$, and $V_C$ can be set to be equal to a Tx weight vector that is some function of the Tx weight vector that corresponds to the PMI feedback from the UE.

The co-phasing weight vector Vp is chosen to optimize the radiation pattern of the Tx array in the elevational (vertical) dimension. One solution is to set $V_P$ to be equal to the largest eigenvector of $H^H*H$, where $H=[H_A V_A, H_B V_B, H_C V_C]$, and $V_P$ is [E×1] (E=3, for example). Alternatively, Vp can be set equal to the largest eigenvector of $(H_A)^H H_A + (H_B)^H H_B + (H_C)^H H_C$ (block 919). For Rank=2 or more transmission, the elevation dimension of the Tx array for each of a plurality of input streams may be adapted exactly as in a Rank 1 case, except that the elevational co-phasing for each stream (rank) is treated separately based upon a respective Tx weight vector being used for a corresponding azimuthally adjusted input stream (block 921).

FIG. 8 is a block diagram of an illustrative antenna configuration for providing RANK-2 transmission (e.g., spatial multiplexing transmission such as Single User MIMO or Multi-User MIMO). This configuration employs a first panel 801 and a second panel 802. These first and second panels 801, 802 may, but need not, be similar to the first and second panels 501, 502 previously described in conjunction with FIGS. 4, 6A and 6B. In the present example, the panels of FIG. 8 include fewer logical arrays than the panels of FIGS. 4, 6A and 6B, but in general it is possible to use a different number of logical arrays and/or a different number of panels than that depicted in FIG. 8.

The first and second panels 801, 802 (FIG. 8) are organized into a plurality of sub-arrays. As before, each respective sub-array of the plurality of sub-arrays will provide a corresponding elevation beam. For example, use of two sub-arrays will provide E=2 different elevation beams. A first sub-array, Array A, includes logical antennas A1 and A2 of the first panel 801, as well as logical antennas A3 and A4 of the second panel 802. Similarly, a second sub-array, Array B, includes logical antennas B1 and B2 of the first panel 801, as well as logical antennas B3 and B4 of the second panel

802. Thus, Array A and Array B each include M=4 logical elements wherein each logical element constitutes an LTE antenna port.

A first [E×1] elevational co-phasing weight vector $V_{P1}$ is applied to a first input stream $s_1(k)$, and a second [E×1] elevational co-phasing vector $V_{P2}$ is applied to a second input stream $s_2(k)$. $V_{P1}$ and $V_{P2}$ are chosen to adapt the radiation pattern of the first and second panels 801, 802 in the vertical (elevational) dimension. In the present example, E=2, and thus, the elevational co-phasing weight vectors $V_{P1}$ and $V_{P2}$ are each [2×1]. Thus, the first [E×1] elevational co-phasing weight vector $V_{P1}$ is selected to co-phase $s_1(k)$, and the second [E×1] elevational co-phasing vector $V_{P2}$ is selected to co-phase $s_2(k)$.

Next, an [M×2] azimuthal weight vector $V_A$ for Array A, comprising A1, A2, A3, and A4, is applied to the elevationally-weighted first input stream $s_1(k)$ and the elevationally-weighted second input stream $s_2(k)$. Similarly, an [M×2] azimuthal weight vector $V_B$ for Array B, comprising B1, B2, B3, and B4, is applied to the elevationally-weighted first input stream $s_1(k)$ and the elevationally-weighted second input stream $s_2(k)$. $V_A$ and $V_B$ are chosen to adapt the radiation pattern of the first and second panels 801, 802 in the horizontal (azimuthal) dimension. In the present example, M=4, and thus, the weight vectors $V_A$ and $V_B$, are each [4×2].

The first input stream $s_1(k)$ is weighted for the elevational (vertical) dimension by applying the first [E×1] elevational co-phasing weight vector $V_{P1}$ to one or more multipliers. In the illustrative example of FIG. 8, the first input stream $s_1(k)$ is applied to a first input of a first multiplier 811 and a first input of a second multiplier 812. A second input of the first multiplier 811 applies a first weight $V_{P11}(k)$ of the weight vector $V_{P1}$ to $s_1(k)$. A second input of the second multiplier 812 applies a second weight $V_{P21}(k)$ of the weight vector $V_{P1}$ to $s_1(k)$. Similarly, the second input stream $s_2(k)$ is weighted for the elevational (vertical) dimension by applying the second [E×1] elevational co-phasing weight vector $V_{P2}$ to one or more multipliers. The second input stream $s_2(k)$ is applied to a first input of a third multiplier 813 and a first input of a fourth multiplier 814. A second input of the third multiplier 813 applies a first weight $V_{P12}(k)$ of the weight vector $V_{P2}$ to $s_2(k)$. A second input of the fourth multiplier 814 applies a second weight $V_{P22}(k)$ of the weight vector $V_{P2}$ to $s_2(k)$.

After the first and second input streams $s_1(k)$ and $s_2(k)$ have been weighted for the elevational (vertical) dimension, the elevationally weighted first and second input streams are then weighted for the azimuthal (horizontal) dimension. Weighting in the azimuthal dimension is accomplished by applying the first [M×2] weight matrix $V_A$ for Array A and the second [M×2] weight matrix $V_B$ for Array B to one or more multipliers. The configuration of FIG. 8 provides a total of four LTE antenna ports wherein a first port and a second port are used by the first input stream $s_1(k)$ and a third port and a fourth port are used by the second input stream $s_2(k)$. The output of the first multiplier 811, representing the first port, is connected to a first input of a fifth multiplier 815, a first input of a sixth multiplier 816, a first input of a seventh multiplier 817, and a first input of an eighth multiplier 818. An output of the second multiplier 812, representing the second port, is connected to a first input of a ninth multiplier 819, a first input of a tenth multiplier 820, a first input of an eleventh multiplier 821, and a first input of a twelfth multiplier 822.

An output of the third multiplier 813, representing the third port, is connected to a first input of a thirteenth multiplier 823, a first input of a fourteenth multiplier 824, a first input of a fifteenth multiplier 825, and a first input of a sixteenth multiplier 826. An output of the fourth multiplier 814, representing the fourth port, is connected to a first input of a seventeenth multiplier 827, a first input of an eighteenth multiplier 828, a first input of a nineteenth multiplier 829, and a first input of a twentieth multiplier 818.

The first [M×2] weight matrix $V_A$ for Array A is applied to the fifth, sixth, seventh, eighth, thirteenth, fourteenth, fifteenth, and sixteenth multipliers 815, 816, 817, 818, 823, 824, 825, and 826 as follows. A first weight $V_{A11}(k)$ from the weight matrix $V_A$ is applied to a second input of the fifth multiplier 815. A second weight $V_{A21}(k)$ from the weight matrix $V_A$ is applied to a second input of the sixth multiplier 816. A third weight $V_{A31}(k)$ from the weight matrix $V_A$ is applied to a second input of the seventh multiplier 817. A fourth weight $V_{A41}(k)$ from the weight matrix $V_A$ is applied to a second input of the eighth multiplier 818. A fifth weight $V_{A12}(k)$ from the weight matrix $V_A$ is applied to a second input of the thirteenth multiplier 823. A sixth weight $V_{A22}(k)$ from the weight matrix $V_A$ is applied to a second input of the fourteenth multiplier 824. A seventh weight $V_{A32}(k)$ from the weight matrix $V_A$ is applied to a second input of the fifteenth multiplier 825. An eighth weight $V_{A42}(k)$ from the weight matrix $V_A$ is applied to a second input of the sixteenth multiplier 826.

The second [M×2] weight matrix $V_B$ for Array B is applied to the ninth, tenth, eleventh, twelfth, seventeenth, eighteenth, nineteenth, and twentieth multipliers 819, 820, 821, 822, 827, 828, 829, and 830 as follows. A first weight $V_{B11}(k)$ from the weight matrix $V_B$ is applied to a second input of the ninth multiplier 819. A second weight $V_{B21}(k)$ from the weight matrix $V_B$ is applied to a second input of the tenth multiplier 820. A third weight $V_{B31}(k)$ from the weight matrix $V_B$ is applied to a second input of the eleventh multiplier 821. A fourth weight $V_{B41}(k)$ from the weight matrix $V_B$ is applied to a second input of the twelfth multiplier 822. A fifth weight $V_{B12}(k)$ from the weight matrix $V_B$ is applied to a second input of the seventeenth multiplier 827. A sixth weight $V_{B22}(k)$ from the weight matrix $V_B$ is applied to a second input of the eighteenth multiplier 828. A seventh weight $V_{B32}(k)$ from the weight matrix $V_B$ is applied to a second input of the nineteenth multiplier 829. An eighth weight $V_{B42}(k)$ from the weight matrix $V_B$ is applied to a second input of the twentieth multiplier 830.

The elevationally and azimuthally weighted first and second streams $s_1(k)$ and $s_2(k)$ are combined using at least one combiner, and the streams thus combined are then fed to the first and second panels 801, 802. In the example of FIG. 8, an output of the fifth multiplier 815 is fed to a first input of a first combiner 841 and an output of the thirteenth multiplier 823 is fed to a second input of the first combiner 841. An output of the first combiner 841, mathematically denoted as $X_{A1}(k)$, is fed to the logical antenna A1. An output of the sixth multiplier 816 is fed to a first input of a second combiner 842 and an output of the fourteenth multiplier 824 is fed to a second input of the second combiner 842. An output of the second combiner 842, mathematically denoted as $X_{A2}(k)$, is fed to the logical antenna A2. An output of the seventh multiplier 817 is fed to a first input of a third combiner 843 and an output of the fifteenth multiplier 825 is fed to a second input of the third combiner 843. An output of the third combiner 843, mathematically denoted as $X_{A3}(k)$, is fed to the logical antenna A3. An output of the eighth multiplier 818 is fed to a first input of a fourth combiner 844 and an output of the sixteenth multiplier 826 is fed to a second input of the fourth combiner 844. An output of the fourth combiner 844, mathematically denoted as $X_{A4}(k)$, is fed to the logical antenna A4.

An output of the ninth multiplier 819 is fed to a first input of a fifth combiner 845 and an output of the seventeenth multiplier 827 is fed to a second input of the fifth combiner 845. An output of the fifth combiner 845, mathematically denoted as $X_{B1}(k)$, is fed to the logical antenna B 1. An output of the tenth multiplier 820 is fed to a first input of a sixth combiner 846 and an output of the eighteenth multiplier 828 is fed to a second input of the sixth combiner 846. An output of the sixth combiner 846, mathematically denoted as $X_{B2}(k)$, is fed to the logical antenna B2. An output of the eleventh multiplier 821 is fed to a first input of a seventh combiner 847 and an output of the nineteenth multiplier 829 is fed to a second input of the seventh combiner 847. An output of the seventh combiner 847, mathematically denoted as $X_{B3}(k)$, is fed to the logical antenna B3. An output of the twelfth multiplier 822 is fed to a first input of an eighth combiner 848 and an output of the twentieth multiplier 830 is fed to a second input of the eighth combiner 848. An output of the eighth combiner 848, mathematically denoted as $X_{B4}(k)$, is fed to the logical antenna B4. It is important to note that the components and configuration shown in FIG. 9 can be implemented digitally via baseband signal processing and not necessarily with discrete components.

Figure 9:
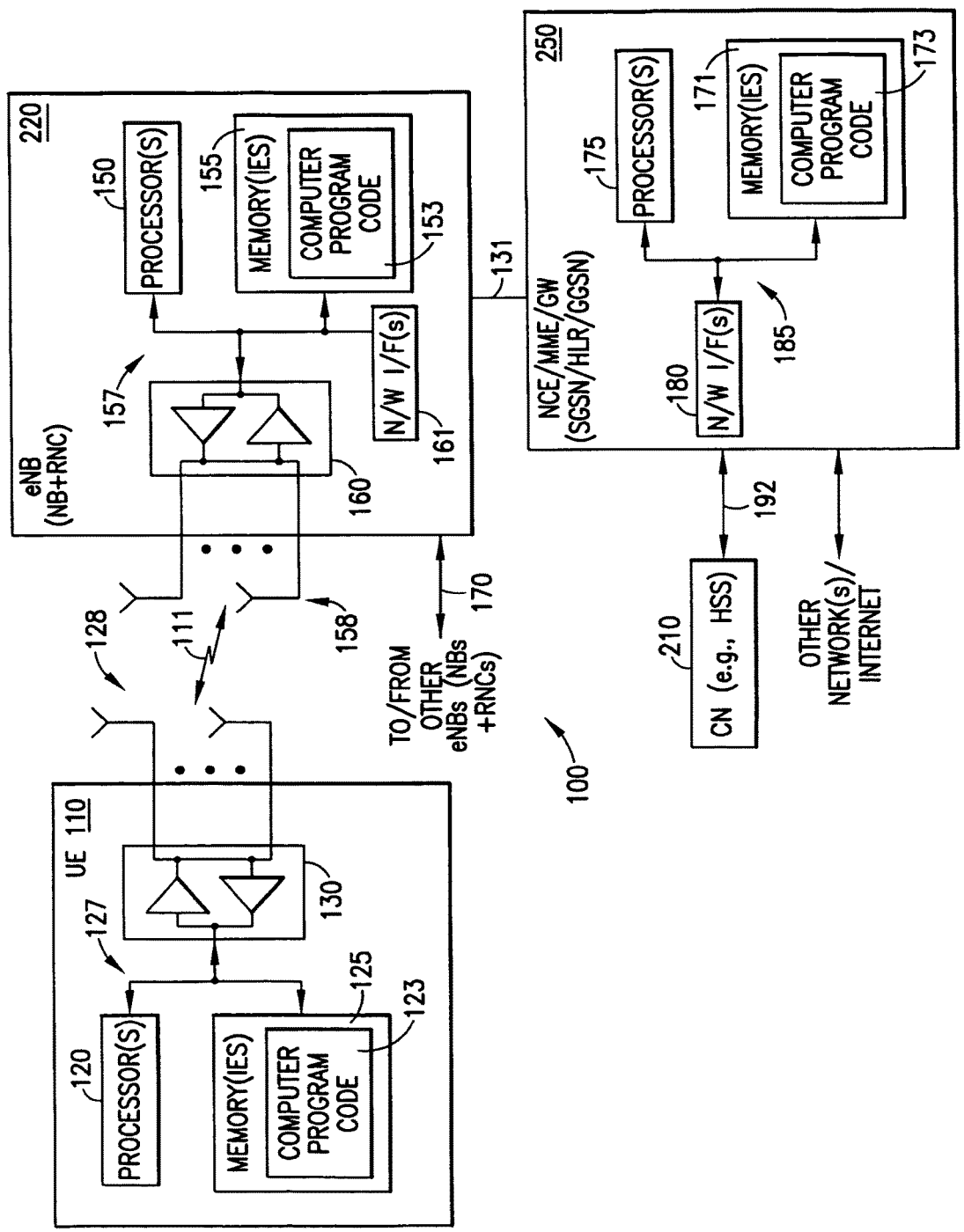
FIG. 9 is a hardware block diagram showing an illustrative operational environment for use with the instant invention.

It is helpful to describe an exemplary system in which the exemplary embodiments may be practiced. FIG. 9 shows such an exemplary system. A user equipment (UE) 110 is in wireless communication with a network 100. The UE 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured, with the one or more processors 120, to cause the UE 110 to perform one or more of the operations as described herein. The UE 110 communicates with a base station (eNB) 220 via a link 111.

The eNB 220 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured, with the one or more processors 150, to cause the eNB 220 to perform one or more of the operations as described herein. The one or more network interfaces 161 communicate over a network such as the networks 170 and 131. Two or more eNBs 220 may communicate using, e.g., the network 170. The network 170 may be wired or wireless or both.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 9. A computer-readable medium may comprise a computer-readable storage medium (e.g., memories 125, 155, 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined. Although various aspects of the invention are set out above, other aspects of the invention comprise other combinations of features from the described embodiments, and not solely the combinations explicitly set out above.

It is also noted herein that while the above describes example embodiments of the invention, these descriptions should not be viewed in a limiting sense. Rather, there are several variations and modifications which may be made without departing from the scope of the present invention.

The invention claimed is:

1. A method comprising:
   phasing a vertical dimension of an array including multiple antenna elements and phasing an azimuthal dimension of the array to provide a combined radiation pattern for the array, the vertical dimension of the array having a first radiation pattern and the azimuthal dimension of the array having a second radiation pattern; and
   controlling in a downlink transmission the combined radiation pattern in both the vertical and azimuthal dimensions at least by simultaneously:
      controlling in the downlink transmission the combined radiation pattern in the vertical dimension based upon an uplink channel measurement; and
      controlling in the downlink transmission the combined radiation pattern in the azimuthal dimension based upon a precoding feedback from a user equipment.

2. The method of claim 1 wherein the first radiation pattern is substantially orthogonal to the second radiation pattern.

3. The method of claim 1 wherein the precoding feedback from the user equipment is a precoder matrix index feedback.

4. The method of claim 1 wherein the uplink channel measurement is based on an uplink signal sent from the user equipment and received at the array.

5. The method of claim 4 wherein the uplink signal is an uplink sounding signal sent from the user equipment.

6. The method of claim 1 wherein the combined radiation pattern is simultaneously, sequentially, or continuously controlled and optimized for each of a plurality of user equipments.

7. The method of claim 1, wherein phasing, controlling the combined radiation pattern in the vertical dimension, and controlling the combined radiation pattern in the azimuthal dimension are performed via baseband signal processing.

8. An apparatus comprising:
   at least one memory including computer program code; and
   at least one processor,
   the at least one memory and the computer program code configured, with the at least one processor, to cause the apparatus to perform at least the following:
   phase a vertical dimension of an array including multiple antenna elements and an azimuthal dimension of the array to provide a combined radiation pattern for the array, the vertical dimension of the array having a first radiation pattern and the azimuthal dimension of the array having a second radiation pattern; and control in a downlink transmission the combined radiation pattern in both the vertical and azimuthal dimensions at least by simultaneously: controlling in the downlink transmission the combined radiation pattern in the vertical dimension based upon an uplink channel measurement, and controlling in the downlink transmission the combined radiation pattern in the azimuthal dimension based upon a precoding feedback from a user equipment.

9. The apparatus of claim 8 wherein the precoding feedback from the user equipment is a precoder matrix index feedback.

10. The apparatus of claim 8 wherein the uplink channel measurement is based on an uplink sounding signal sent from the user equipment and received at the array.

11. The apparatus of claim 8 wherein the combined radiation pattern is simultaneously, sequentially, or continuously controlled and optimized for each of a plurality of user equipments.

12. The apparatus of claim 8 wherein the first radiation pattern is substantially orthogonal to the second radiation pattern.

13. A non-transitory computer readable storage medium with an executable program stored thereon, wherein the program instructs a processing device to perform:

phasing a vertical dimension of an array including multiple antenna elements and phasing an azimuthal dimension of the array to provide a combined radiation pattern for the array, the vertical dimension of the array having a first radiation pattern and the azimuthal dimension of the array having a second radiation pattern; and controlling in a downlink transmission the combined radiation pattern in both the vertical and azimuthal dimensions at least by simultaneously:
  controlling in the downlink transmission the combined radiation pattern in the vertical dimension based upon an uplink channel measurement; and
  controlling in the downlink transmission the combined radiation pattern in the azimuthal dimension based upon a precoding feedback from a user equipment.

14. The non-transitory computer readable storage medium of claim 13 wherein the precoding feedback from the user equipment is a precoder matrix index feedback.

15. The non-transitory computer readable storage medium of claim 13 wherein the uplink channel measurement is based on an uplink sounding signal sent from the user equipment and received at both the first and second arrays.

16. The non-transitory computer readable storage medium of claim 13 wherein the first radiation pattern is substantially orthogonal to the second radiation pattern.

* * * * *